United States Patent [19]

Gerling

[11] Patent Number: 4,630,945
[45] Date of Patent: Dec. 23, 1986

[54] BEARING HOUSING

[75] Inventor: Paul Gerling, Oberhausen, Fed. Rep. of Germany

[73] Assignee: Glyco-Maschinenbau GmbH, Essen, Fed. Rep. of Germany

[21] Appl. No.: 723,797

[22] Filed: Apr. 16, 1985

[30] Foreign Application Priority Data

Apr. 17, 1984 [DE] Fed. Rep. of Germany ....... 3414476

[51] Int. Cl.$^4$ .......... F16C 3/13; F16C 37/00; F16C 35/02; F24H 3/12
[52] U.S. Cl. .................... 384/320; 165/47; 384/278; 384/900
[58] Field of Search ........... 384/317, 318, 320, 321, 384/467, 476, 278, 900; 464/17; 165/47; 123/41.69; 308/DIG. 14

[56] References Cited

U.S. PATENT DOCUMENTS

| | | | |
|---|---|---|---|
| 2,396,363 | 3/1946 | DuBois et al. | 123/41.69 X |
| 2,617,395 | 11/1952 | Haase | 123/41.69 X |
| 2,816,529 | 12/1957 | Flatz et al. | 123/41.69 X |
| 3,922,043 | 11/1975 | Tompkins | 384/476 |
| 4,194,798 | 3/1980 | Schonwald et al. | 384/476 |
| 4,515,111 | 5/1985 | Vosmeyer et al. | 123/41.69 X |

FOREIGN PATENT DOCUMENTS 2502805 7/1976 Fed. Rep. of Germany ...... 384/320
31690 7/1978 Fed. Rep. of Germany .

*Primary Examiner*—Stuart S. Levy
*Assistant Examiner*—Lynn M. Sohacki
*Attorney, Agent, or Firm*—Karl F. Ross; Herbert Dubno

[57] ABSTRACT

A plain-bearing housing has a two-part housing of which at least the lower part is provided with cooling ribs in horizontal rows whose ribs are mutually staggered. Distinct rib registers can also be provided on the upper housing part. The result is an improved dissipation of heat from a plain bearing of a shaft journaled in this housing.

6 Claims, 3 Drawing Figures

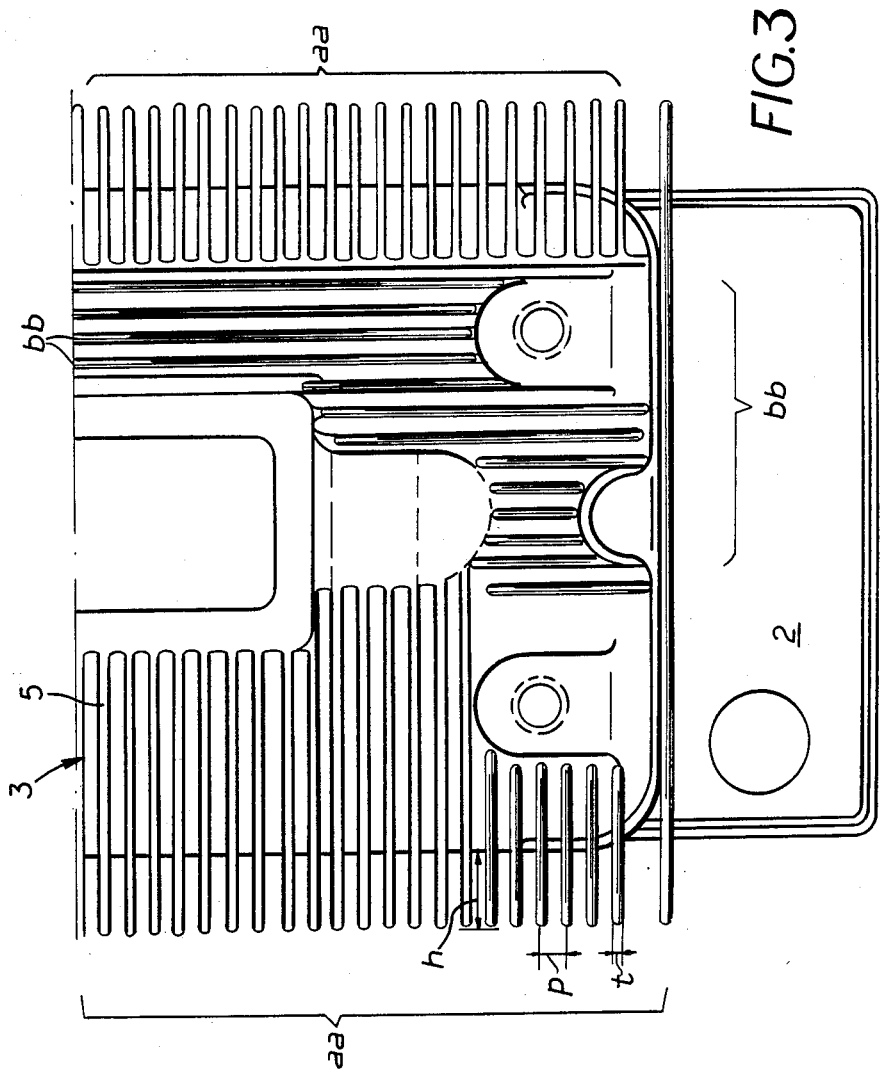

BEARING HOUSING

FIELD OF THE INVENTION

My present invention relates to a plain-bearing housing and, more particularly, to a plain-bearing housing of the type in which a lower portion of a housing is connected to an upper portion of the housing at a junction, the housing receiving a plain or friction bearing in which a shaft can be journaled.

BACKGROUND OF THE INVENTION

A plain bearing or friction bearing generally comprises a metal shell having a lining of a bearing material which can also be a metal, lying in friction contact with a rotatable member such as a shaft.

The plain bearing or friction bearing (these terms being used interchangeably) thus is devoid of rolling elements of the type which constitutes roller bearings. For journaling a shaft, for example, they can be received in a bearing housing.

German Industrial Standard DIN 31 690 establishes a standard construction for such bearing housings which allows them to dissipate the thermal energy created by friction in the bearing in a highly effective way. The present invention, therefore, is principally directed to improving upon the type of plain-bearing housing within German Industrial Standard DIN 31 690.

As will be apparent from this industrial standard and as is generally the case in industry, to enable the bearing to be assembled onto the shaft, the bearing may be provided in two halves and/or the housing can be provided in two halves, a two-part housing being also useful when the bearing is a circumferentially continuous sleeve.

The two-part housing can comprise a lower housing part and an upper housing part which can be connected to the lower housing part along a junction which generally extends through the opening defined by the two housing parts and through which the shaft projects. Such housings may be upright stationary journals or plain-bearing housings or flange plain-bearing housings. In general the housings are provided with ribs to promote dissipation of heat, i.e. cooling.

The housing can also include means for closing the front side of the housing through which the bearing is accessible or which may be overhung by the plain bearing. When reference is made, therefore, to cooling ribs at least on one front side of the housing, it is intended to indicate that the cooling ribs can be provided on the front side of the housing which may carry the aforementioned closure although it should be noted that the cooling ribs will generally also be provided on the opposite side of the housing, i.e. both freely visible front sides of the housing can be provided with cooling ribs.

The above-mentioned German Industrial Standard describes a plain-bearing housing in which the upper part of the housing does not have such cooling ribs. In practice, however, it is common to provide the housing upper part with cooling ribs and the cooling ribs extend the full height of the lower part of the housing to the region of the junction or the shaft opening. Otherwise, apart from interruptions at which eyes for bolts or like structures are provided, a single rib lies in a single plane and extends the full height of the housing and remains in this plane even if interrupted by a bolt hole or the like.

The conventional plain-bearing housings have not proved to be altogether successful, especially for high-loading bearings, at least in part because the possibility of abstracting heating is limited. It is true that the dissipation of heat is a function of temperature and ambient conditions, but it has been frequently found that the life of the bearing shells has been limited because of insufficient heat dissipation.

Obviously one can use a force circulation in conjunction with such bearings to increase the heat dissipation therefrom, but this is generally uneconomical and involves significant complications because of the locations at which such bearings must be provided.

Furthermore, one cannot deviate materially from accepted industrial standards, namely the German Industrial Standard DIN 31 690 if the bearing housing is to have widespread acceptance.

OBJECTS OF THE INVENTION

It is therefore, the principal object of my present invention to provide an improved plain-bearing housing with increased heat dissipation and thus the ability to so withdraw heat from the bearing as to increase the useful life thereof.

Yet another object of this invention is to provide a plain-bearing housing which does not deviate from the requirements of existing standards, especially the German Industrial Standard DIN 31 690, but which nevertheless is characterized by increased life of the bearing shells which are used therein.

SUMMARY OF THE INVENTION

These objects and others which will become apparent hereinafter are attained, in accordance with the present invention in a bearing housing for a plain bearing which comprises an upper part, a lower part forming a junction with the upper part and defining a shaft opening therewith at a front side of the housing, both upper and lower housing parts being formed with cooling ribs which extend substantially to the junction and to the opening and such ribs are also provided on the top of the upper part of the housing.

According to my invention, these ribs lie in parallel planes parallel to the axis of the housing and preferably in vertical planes and are transversely spaced apart, preferably equispaced. In the transverse direction, moreover, at least the lower part of the housing has its ribs disposed in rows with the ribs of adjacent rows being staggered in the transverse direction so that a rib in one row is aligned with a gap between ribs of the adjacent row and vice versa, thereby forming a rib register which promotes the undulating flow of air upwardly between the ribs greatly accelerating heat transfer therefrom.

It has been found to be advantageous, moreover, to form the ribs of the upper part of the housing as a rib register, i.e. in vertically separated rows in which the ribs of the adjoining rows are mutually staggered.

Advantageously, the rows of ribs of the housing lower part extend horizontally or along arcs around the opening.

The distinct registers can also be provided on the upper part.

Consequently, the upper housing part has cooling ribs which at least on one of its front sides forms a front side rib register and in addition an upper side rib register, each rib register comprising a plurality of rows of ribs or vanes with the ribs or vanes of adjacent rows mutually staggered, the rib spacing within each row being identical for both the housing upper and lower parts.

The ribs or vanes of the upper side rib registers can lie orthogonal to the ribs or vanes of the front side rib registers of the housing upper part.

I have found as one of the problems with existing constructions under the German Industrial Standard DIN 31 690 is that the long ribs extending substantially unbroken from the bottom of the housing to the top thereof, at least on the front sides of the housing do not promote sufficient heat transfer to the rising air, by contrast with the multiply subdivided paths defined by the staggered row arrangement described above. The path of air upwardly along the ribs therefore undulates and a vastly improved heat exchange is obtained.

The staggering or offset can be by half the pitch of the ribs, the pitch of the ribs being defined here as the center-to-center spacing of successive ribs of a row. It is also possible to provide an offset of staggering which is, say, about one-third the pitch.

In practice I have found that while the additional cost of fabrication in casting the housing parts of the invention is insignificant at most, I am able to obtain an improvement of the overall heat transfer coefficient of the rib structure by about 15% for a given total rib area.

Apparently there is an enhanced utilization of the rib area for heat exchange for embodiments which utilize only ribs lying parallel to the axis as well as ribs perpendicular to the plane of the axis, i.e. running radially.

When the housing is provided with a closure ring or cover to close off the accessible space receiving the plain bearing, this closure ring or plate should also be provided with vertical cooling ribs in rows which are mutually staggered. The ribs of the closure plate should be staggered with respect to the ribs of the upper and lower parts of the housing adjoining the closure plate.

It may be pointed out that the ribs of the closure plate may be continuous for the full height thereof if desired without a marked reduction in heat dissipation effectiveness.

While the bearing housing in accordance with the German Industrial Standard DIN 31 690 may be provided in various sizes, I have found that there are dimensions of the ribs which provide an improvement over a wide range of such different sizes of bearing housings. For example, when the bearing housing is designed for shafts of a diameter between 80 and 1000 mm, the rib spacing or pitch should be about 10 to 20 mm (preferably about 15 mm) while the rib height (measured from the base from which the rib projects to the outermost limit of the rib) should be between about 15 and about 50 mm preferably between 20 and 25 mm. The rib thickness should be about 2 to 6 mm, preferably about 4 mm and as can be ascertained from the latter dimension, the free space between neighboring cooling ribs should be about 10 mm.

Depending upon the size of the housing, for a given temperature differential between the housing and the environment, utilizing free convection, the heat transfer can be improved up to 50% above that obtained with conventional bearing housings and if measurements are done to maintain the heat abstractions the same, the bearing housing of the invention can operate with a 30% lower differential in temperature between the housing surface and the environment. This means, of course, that the temperature at the plain bearing is markedly reduced and the plain bearing for a given loading can have an increased life or, conversely, can sustain a higher loading while nevertheless having a useful life comparable to that of conventional plain bearings in conventional housings.

BRIEF DESCRIPTION OF THE DRAWING

The above and other objects, features and advantages of the present invention will become more readily apparent from the following description, reference being made to the accompanying drawing in which:

FIG. 3 is a plan view of a portion of the housing applicable to both the embodiment of FIG. 1 and the embodiment of FIG. 2.

SPECIFIC DESCRIPTION

Figure 1:
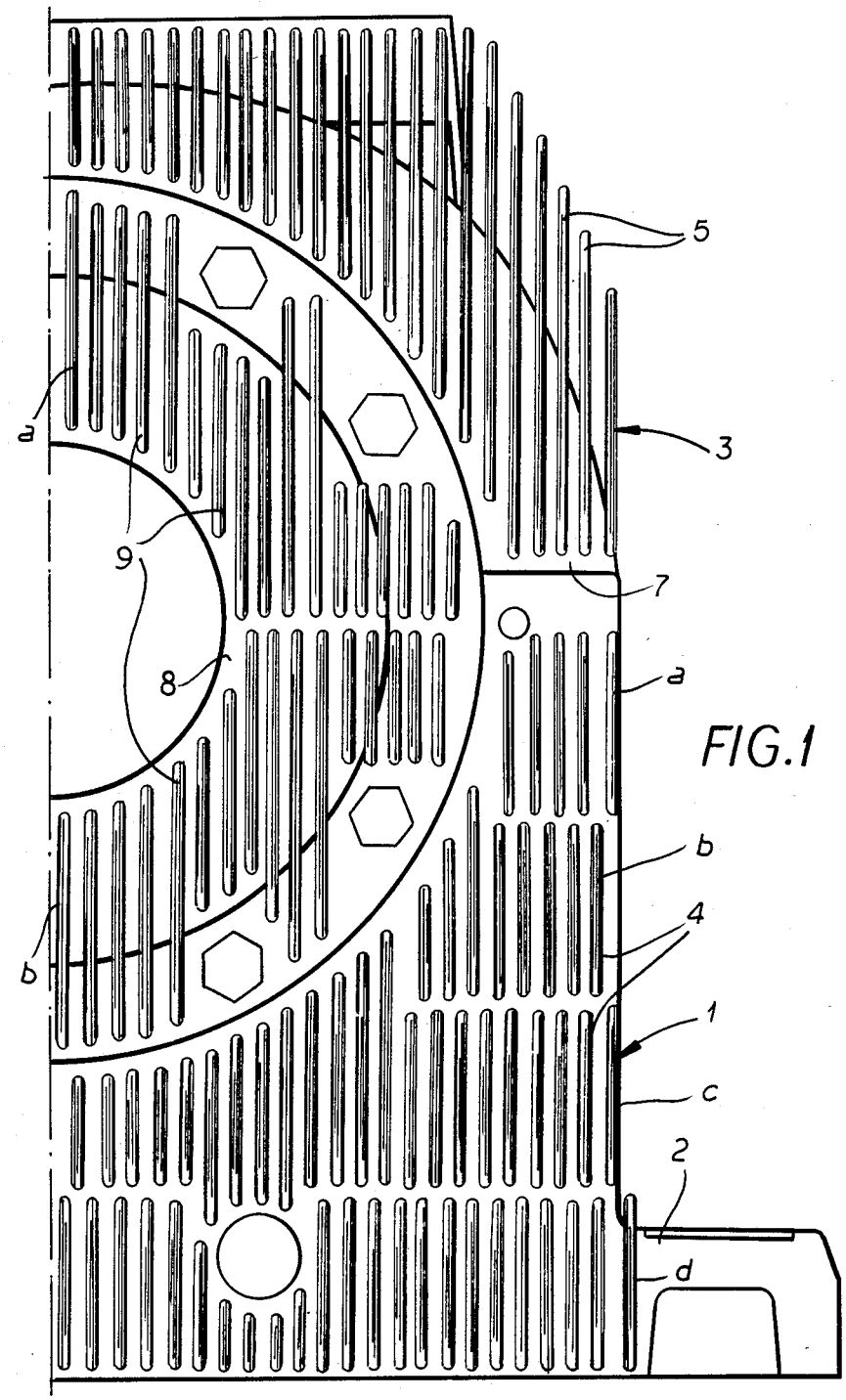
FIG. 1 is a front elevational view showing half of an upright bearing housing for a plain bearing according to the invention.

In the drawing I show a stationary upright plain-bearing housing designed to conform to German Industrial Standard DIN 31 690. The basic elements of this structure include a lower housing part 1 with a foot 2 which can be bolted to a support, and an upper housing part 3 which can be affixed to the lower housing part.

The two housing parts 1 and 3 are cast unitarily with cooling ribs 4 and 5, the cooling ribs 4 being seen on the front side in FIG. 1 as extending vertically.

The ribs also can be provided on the axially opposite side of the bearing housing which is also denominated a front side for this purpose or as a rear side.

Figure 2:
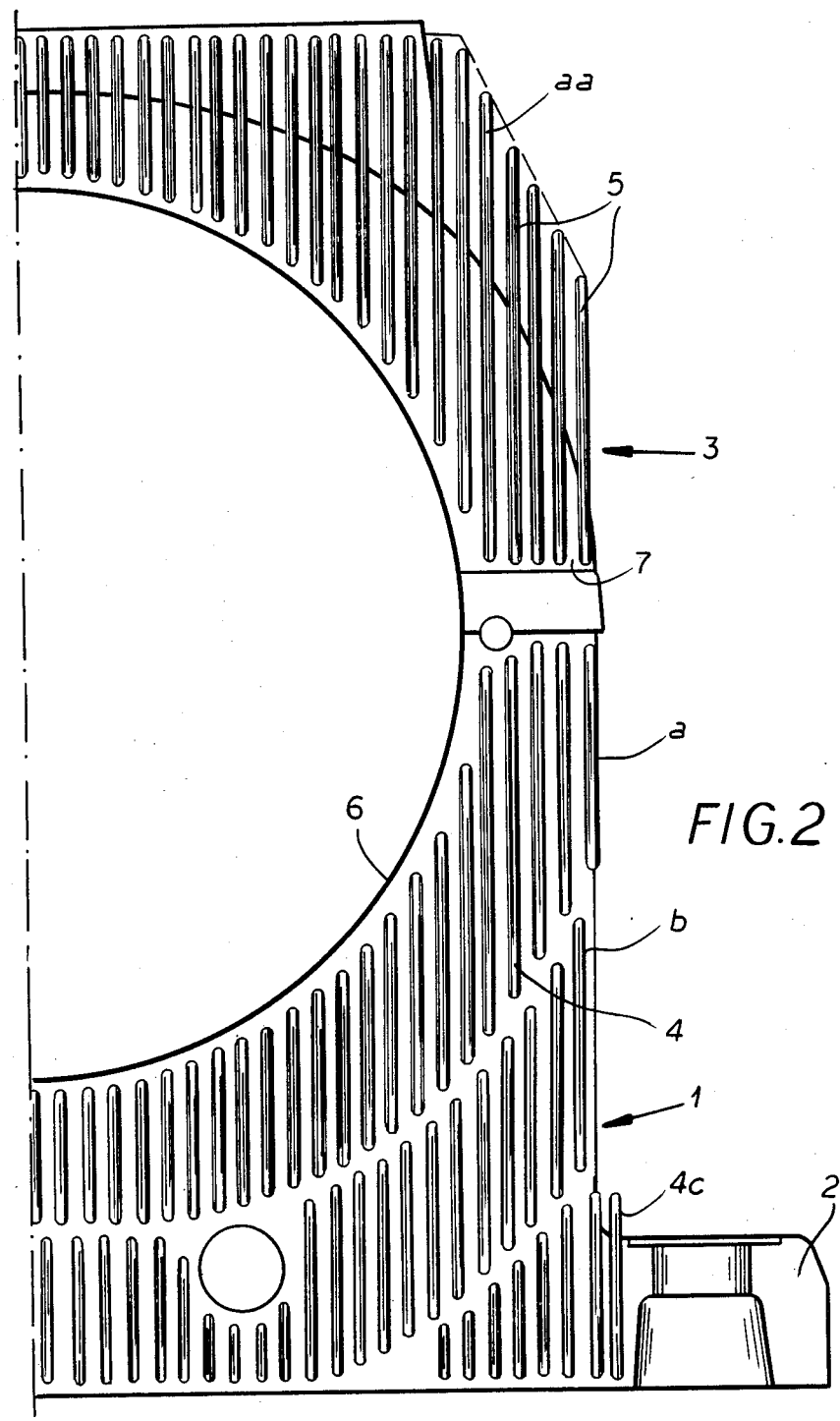
FIG. 2 is a similar view illustrating another embodiment.

The cooling ribs 5 of the upper part completely cover the front side except for the opening traversed by the shaft and represented generally at 6 (see FIG. 2) and these ribs also extend substantially to the junction 7 between the upper and lower parts. Cooling ribs 5 also are provided on the upper side of the upper part 3 of the housing as can be seen in FIG. 3. The ribs 4 of the lower part are subdivided into three or four rows a, b, c, d of ribs in superposed relationship. In the embodiment of FIG. 1 these rows extend horizontally whereas in the embodiment of FIG. 2, the rib rows lie along circular arcs centered on the shaft axis.

Adjacent rows a, b and b, c and c, d of the ribs of the lower housing part are staggered horizontally with respect to one another, i.e. a rib of row a is disposed vertically above the space between ribs of row b, whereas the ribs of row b are each disposed vertically in line with spaces between the ribs of row c, etc. In FIG. 1 this staggering is seen to be half the rib pitch. The upper housing part can have its ribs 5 similarly staggered with respect to the ribs 4 and, if desired also formed in rows with respective rib registers.

From FIG. 3 it will be apparent that the ribs 5 on both front sides of the housing define respective rib registers a while other ribs 5 form a rib register bb, the ribs of which are perpendicular to the ribs 5 of register aa, i.e. lie in planes perpendicular to the axis of the shaft and to the plane of the ribs of registers aa. It is also possible to extend some of the ribs of register aa onto the upper surface of the upper part of the housing as has been shown for the left hand rib register aa in FIG. 3. All of the rib registers of the housing upper part 3 have the same rib pitch.

FIG. 1 shows that the housing can also include a closure plate 8 in the form of a ring bolted to the upper and lower parts of the housing and thus joining them together. This closure plate 8 is likewise provided with cooling ribs 9. These can be divided into arcuate rib rows a and b as well or into horizontal rib rows analogous to the rib rows c and d previously described. The offset between the rib rows a and b of the closure plate 8 is likewise half the rib pitch.

All of the rib registers have the same rib pitch, preferably the same rib height and the same rib thickness. The rib height is represented at h in FIG. 3 whereas the rib thickness is shown at t and the rib pitch at p.

Preferably the rib pitch p is about 15 mm, the rib height h between 20 and 25 mm and the rib thickness t about 4 mm for bearing housings for shaft diameters of 100 to 1000 mm.

I claim:

1. A plain-bearing housing for plain shaft bearings, comprising a bottom housing part and an upper housing part together defining a passage for a shaft and adapted to receive a plain bearing, said housing parts joining along a junction extending through said passage, said housing parts each being provided upon opposite axial sides thereof with cooling ribs lying substantially in parallel planes and uniformly spaced transversely apart, an upper portion of said upper part being additionally provided with cooling ribs, at least the ribs of at least one of said sides of said bottom housing part being provided in at least two rows perpendicularly aligned to the planes of said ribs, the ribs of said rows running vertical and perpendicular to said junction and said ribs being mutually staggered whereby ribs of one of said rows lie in line with spaces between the ribs of an adjoining row, and wherein ribs of said upper housing part are subdivided into respective rib registers.

2. The plain-bearing housing defined in claim 1 wherein the ribs of said upper portion of said upper housing part extend perpendicularly to ribs on at least one of said sides of said upper housing part.

3. The plain-bearing housing defined in claim 1, further comprising a cover plate removable to afford access to said plain bearing in said passage and connected to said housing parts, said cover plate being provided with a plurality of rows of said ribs in mutually offset relationship.

4. The plain-bearing housing defined in claim 3 wherein said rows of ribs of said cover plate are mutually offset by half of the pitch of said ribs.

5. The plain-bearing housing defined in claim 1 wherein said ribs of said rows are mutually offset by half of the pitch of said ribs.

6. The plain-bearing housing defined in claim 1 wherein said housing accommodates a shaft of a diameter of between 80 and 1000 mm, all of said ribs having the same pitch, the same rib height and the same rib thickness, the rib pitch being about 15 mm, the rib height being between 15 and 50 mm and the rib thickness being about 4 mm.

* * * * *